United States Patent [19]

Biebel

[11] Patent Number: 5,096,044
[45] Date of Patent: Mar. 17, 1992

[54] METHOD AND APPARATUS FOR MONITORING THE RUN OF A BELT

[75] Inventor: Juergen Biebel, Ruesselsheim, Fed. Rep. of Germany

[73] Assignee: Carl Schenck AG, Darmstadt, Fed. Rep. of Germany

[21] Appl. No.: 593,106

[22] Filed: Oct. 5, 1990

[30] Foreign Application Priority Data

Oct. 5, 1989 [DE] Fed. Rep. of Germany ....... 3933196

[51] Int. Cl.⁵ .............................................. B65G 43/04
[52] U.S. Cl. ................................ 198/502.4; 198/807; 198/810
[58] Field of Search ................... 198/502.3, 502.4, 806, 198/807, 810; 242/57.1

[56] References Cited

U.S. PATENT DOCUMENTS

| | | | |
|---|---|---|---|
| 3,323,699 | 6/1967 | Bricker, Jr. | 242/57.1 |
| 3,323,740 | 6/1967 | Blessing | 242/57.1 |
| 3,366,876 | 1/1968 | Kurth et al. | 242/57.1 |
| 3,780,297 | 12/1973 | Geary | 198/502.4 |
| 4,264,905 | 4/1981 | Shapiro | 198/502.4 X |
| 4,366,897 | 1/1983 | Azuma et al. | 198/502.4 |
| 4,372,172 | 2/1983 | Gombocz et al. | 198/810 X |
| 4,437,563 | 3/1984 | Oriol | 198/810 |
| 4,462,676 | 7/1984 | Shimura et al. | 198/806 X |
| 4,485,982 | 12/1984 | St. John et al. | 242/57.1 |
| 4,500,045 | 2/1985 | Whitaker et al. | 242/57.1 |
| 4,557,372 | 12/1985 | Rajagopal | 198/807 |
| 4,731,542 | 3/1988 | Doggett | 242/57.1 X |
| 4,839,674 | 6/1989 | Hanagata et al. | 242/57.1 X |
| 4,863,006 | 9/1989 | Kotkata et al. | 198/502.4 X |
| 4,959,040 | 9/1990 | Gardner et al. | 198/807 X |

FOREIGN PATENT DOCUMENTS

| | | |
|---|---|---|
| 1041976 | 10/1958 | Fed. Rep. of Germany . |
| 1018965 | 5/1959 | Fed. Rep. of Germany . |
| 1481024 | 11/1969 | Fed. Rep. of Germany . |
| 2146492 | 3/1973 | Fed. Rep. of Germany . |
| 2355905 | 10/1974 | Fed. Rep. of Germany . |
| 2936344 | 9/1979 | Fed. Rep. of Germany . |
| 3711916 | 10/1988 | Fed. Rep. of Germany . |
| 0089508 | 5/1983 | Japan ................... 198/806 |
| 0171906 | 9/1985 | Japan ................... 198/806 |
| 0178111 | 9/1985 | Japan ................... 198/806 |

OTHER PUBLICATIONS oelhydraulik und pneumatik, 12 (1968) Nr. 2, p. 81.
Guiding and Controlling Conveyor Belts; Automation-Dec. 1972; pp. 56-58.
Article entitled: "Neuartige Bandregelung" from the German Periodical 'Das Papier', pamphlet 21/22, Nov. 1958, pp. 590-591.

Primary Examiner—D. Glenn Dayoan
Attorney, Agent, or Firm—W. G. Fasse

[57] ABSTRACT

The run of a belt, such as a conveyor belt or a belt of a weighing scale, is monitored for keeping the belt in a substantially centered position. For this purpose, the belt has a marking element, and a stationary sensor is so arranged that it can scan at least two edges of the marking element. One marking edge extends perpendicularly to the belt running direction. The other marking edge extends at a slant or angle to the belt running direction. Thus, the sensor produces two marker signals at least one of which changes when the belt makes an off-center excursion. The two marker signals and a belt speed representing signal are processed in a computer to provide a belt deviation signal which may be used to correct the belt direction eitehr normally or automatically. The marking element has a triangular configuration and is so arranged that one side of the triangle extends substantially perpendicularly to the belt running direction.

16 Claims, 5 Drawing Sheets

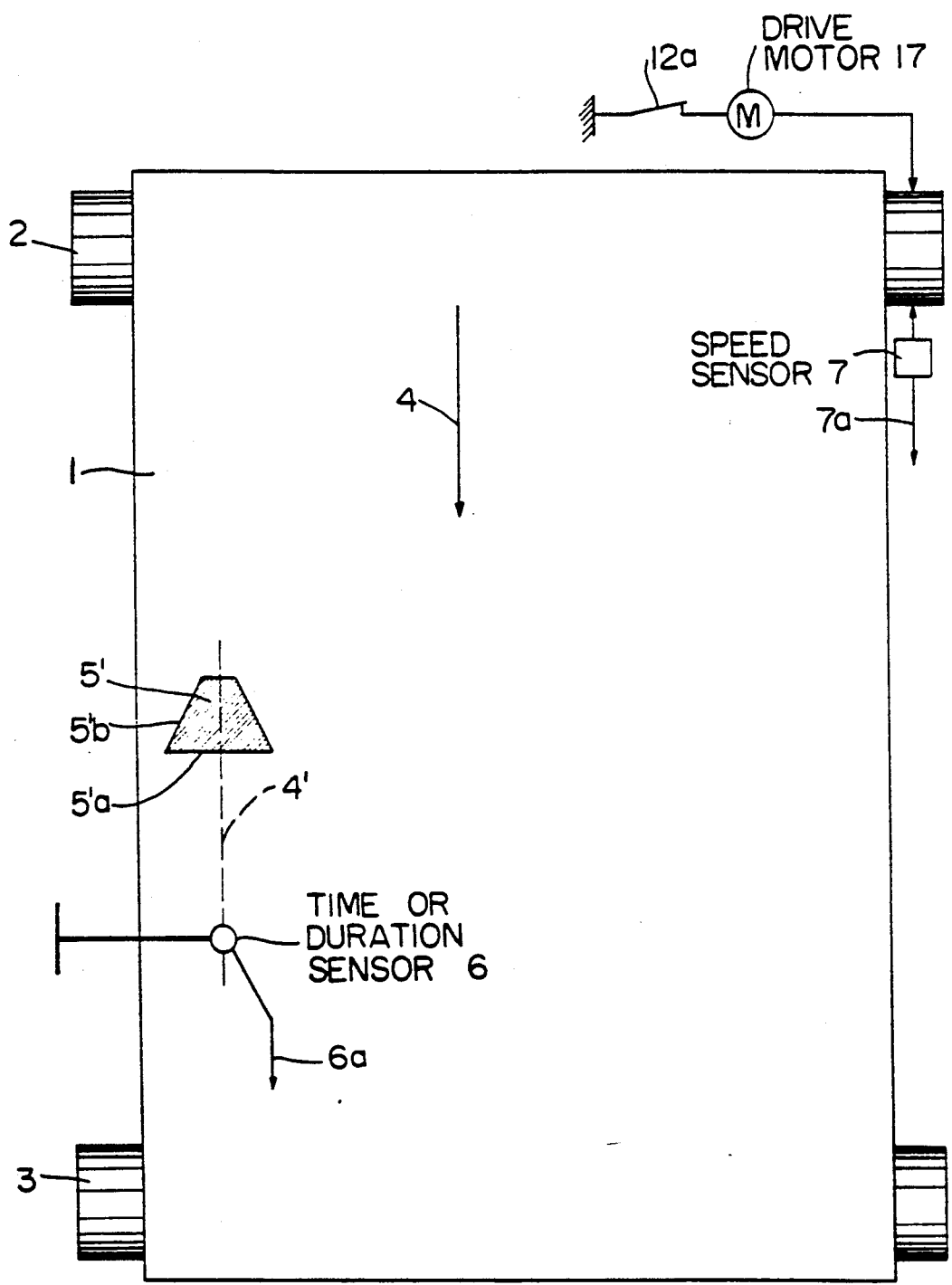

METHOD AND APPARATUS FOR MONITORING THE RUN OF A BELT

FIELD OF THE INVENTION

The invention relates to a method and apparatus for monitoring the run of a belt, such as a conveyor belt, or the belt of a weighing scale, known as so-called belt weighers for dosing bulk material. Such belts must run in a centered manner relative to their driving and guide drums. Therefore, belt excursions perpendicularly to the longitudinal moving direction must be avoided or corrected as quickly as possible.

BACKGROUND INFORMATION

It is known to provide such belt with a marker element that travels along with the belt and to arrange a sensor in a fixed position next to the belt for sensing the marker and to produce a control signal from the sensed marker. For producing a proper control signal, the run of the belt must be monitored with regard to any lateral excursions and also with regard to any slippage between the belt and its driving drum. The slippage is easily determined when a marker on the belt is sensed by a sensor and if the rated belt speed is known. Sensors for this purpose may be, for example, of the inductive pick-up type. Such sensors provide an impulse when the marking element passes the sensor.

It is also known to ascertain lateral belt excursions away from a centered position, by means of end switches which have sensor elements that are contacted by a belt that moves away from its central position. These switches with their sensors are arranged alongside the belt edges in stationary positions. However, the use of these end switches with their sensors requires a substantial structural investment and expense. Further end switches have the disadvantage that they make the monitoring system more troubleprone. Thus, end switches require frequent maintenance work.

German Patent Publication (DE-OS) 2,936,344 discloses a method and apparatus for controlling the linearity of the movement of a conveyor belt relative to a centered position. In this known system the effective drum radius or diameter of a guide drum or of a driving drum is increased so as to urge the belt back to its centered position. In other words, the diameter increase is made on that side toward which the belt is deviating from its centered course. Such a system has its merits. However, it is not readily adaptable for use in connection, for example, with belts in weighing scales also referred to as belt weighers.

OBJECTS OF THE INVENTION

In view of the foregoing it is the aim of the invention to achieve the following objects singly or in combination:

to provide a method for monitoring the running of a belt over guide and drive drums to obtain a signal when the belt run does not satisfy predetermined conditions;

to provide an apparatus for performing such a monitoring method;

to ascertain from a single marker element lateral belt deviations from a centered run and belt slippage so as to determine the instantaneous position of the belt in a lateral direction as well as in a slipping direction which coincides with the longitudinal belt running direction;

to provide an unambiguous measure for a lateral belt deviation and for the belt slippage; and to shape a single marker element in such a way that it will be able to provide a lateral deviation signal as well as a slippage representing signal that can be used for correction purposes.

SUMMARY OF THE INVENTION

According to the invention a single marker element is so shaped that it has at least one edge extending substantially perpendicularly to the running direction of the belt and at least a second marker edge extending at a slant or at an angle relative to the belt running direction. The single marker element cooperates with a stationary sensor which provides at least two sensor signals. Additionally, the instantaneous belt speed is sensed and the resulting three signals are processed in a computer for ascertaining a lateral belt deviation out of a centered position and also the band slippage.

The apparatus according to the invention is characterized in that the single marker element has a triangular configuration and is arranged on or in the belt in such a way that one side of the triangle extends at a right angle or perpendicularly to the belt running direction, while another side of the triangle extends across the belt running direction with a slant. Preferably, the triangular marking element is made of a ferromagnetic metal foil capable of performing a switching function when it passes past a stationary magnetic sensor to produce a switching signal. The marker element may have a V-configuration.

The present method makes it possible to ascertain any lateral belt excursion in a contactless manner and without any troubleprone mechanical elements because the scanning distance between the straight marking edge of the single marking element and the slanted edge of the marking element provides a definite measure for the lateral deviation of the belt from its centered position as the marking element passes by a stationary sensor. Additionally the longitudinal slipping of the belt relative to its driving drum or roller can be ascertained with the aid of such a single marking element. The sensor signals ascertained when both edges of the single marking element pass the sensor and the signal representing the belt speed is suitably processed in a computer circuit or the like to obtain respective information signals that may be displayed for a manual correction or that may be used for an automatic corrective control to return the belt into its centered position. The resulting signals that indicate the lateral deviation or any longitudinal slippage may also be used to provide a preliminary warning or to trigger an alarm or they may be used for stopping the belt altogether, for example, when a sudden lateral deviation should occur.

According to the invention, the single marking element has preferably a triangular configuration, whereby one side of the triangle extends at a right angle or substantially at a right angle relative to the belt running direction. A triangular configuration having three equal sides or an isosceles triangles having two equal sides, is especially suitable for the present purposes. In the latter case the baseline will extend perpendicularly to the belt running direction. In both instances the sensor will ascertain the tip of the triangle when the belt is in its centered condition. When the location of the belt is not in a centered condition, but when it deviates in one or the other direction, the length of belt travel and thus the time between the two marker signals caused by the two edges of the triangle provide a definite measure for a lateral belt deviation. The deviation is the larger the shorter the time duration between the two signals. If the single marking element has the configuration of a rectangular triangle, and if one side of the rectangular triangle extends in the belt running direction while the hypotenuse extends at a slant to the running direction, so that the sensor senses the center of the hypotenuse of the triangle when the belt is in a centered condition, it is possible to ascertain from the sensor signals also the direction of the deviation of the belt to the right or left from its centered running condition. The marking element is preferably constructed, as mentioned, of a metallic foil capable of causing a switching function in the sensor which is preferably a contactless proximity switch.

BRIEF DESCRIPTION OF THE DRAWINGS

In order that the invention may be clearly understood, it will now be described, by way of example, with reference to the accompanying drawings, wherein:

FIG. 1a is a view similar to that of FIG. 1, but showing a single marker element formed as a trapezoid according to the invention;

DETAILED DESCRIPTION OF PREFERRED EXAMPLE EMBODIMENTS AND OF THE BEST MODE OF THE INVENTION

Figure 1:
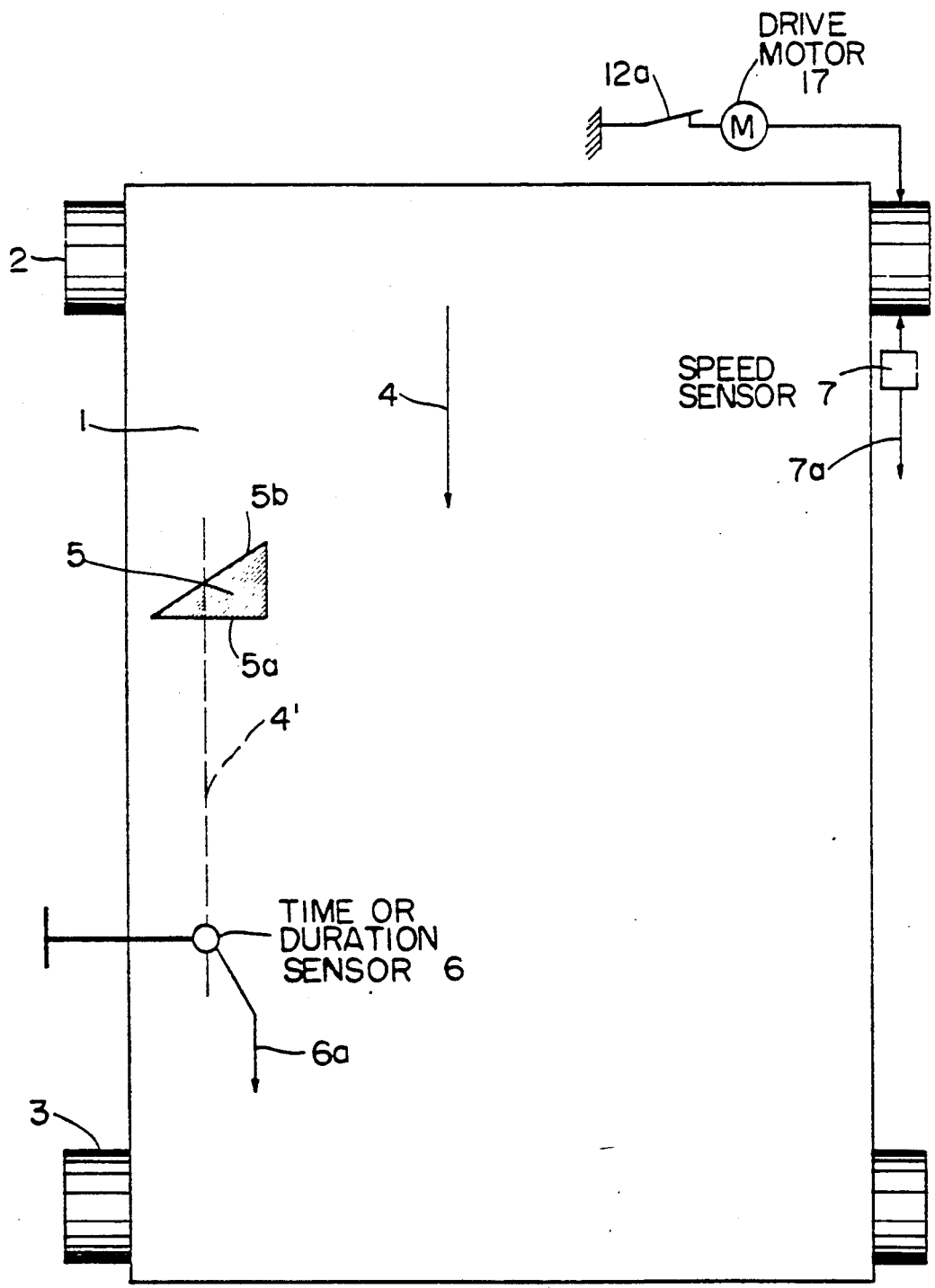
FIG. 1 is a schematic top plan view of a conveyor belt provided with a single marker element formed as a rectangular triangle according to the invention.

In FIG. 1 a belt 1, such as a conveyor belt or the belt of a belt weigher, is driven by a drive roller 2 and runs over a guide roller 3. The belt 1 moves in the direction of the arrow 4. Conveyor belts of dosing scales run normally at relatively small speeds, for example, of less than 0.5 m/s. The conveyor belt 1 is equipped according to the invention with a single marking element 5 having the shape of a rectangular triangle. The rectangular triangle is so arranged on the belt 1 that one triangle side 5a extends perpendicularly to the travel direction 4 also represented by the dashed line 4'. The hypotenuse 5b extends at an angle to the travel direction 4, 4'. In another embodiment, shown in FIG. 1a the single marker 5' has the configuration of a trapezoid having a long side 5'a extending at a right angle to the line 4' and a slanting side 5'b extending at an angle to the line 4'. The trapezoidal shape has been obtained, for example, by truncating a isosceles triangle.

Figure 4:
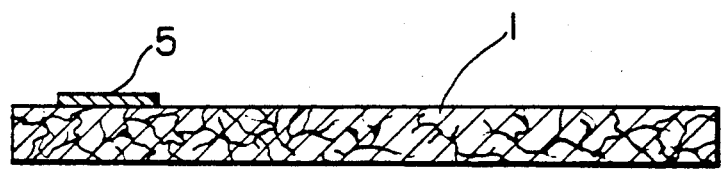
FIG. 4 is a sectional view through a belt with the marker element secured to a belt surface.
Figure 5:
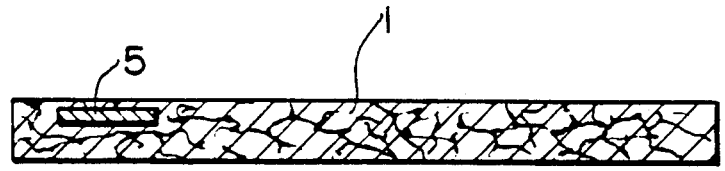
FIG. 5 is a view similar to FIG. 4, but showing the marker element embedded inside the belt.

The marker used according to the invention is either secured to the surface of the belt 1 as shown in FIG. 4, or it is built into the belt 1 as shown in FIG. 5. The manner of securing or mounting the sensor element 5 or 5' is not critical. However, it is critical that one side of the marker element extends substantially perpendicularly to the travel direction, while another side extends at an angle to that direction. The element is made, for example, of a metallic foil capable to cause a switching function in a sensor 6, or it is a marking foil that can reflect a light beam or the like when the marker element is secured to the belt surface. The sensor 6 senses a time duration between the time when the edge 5a or 5'a passes the sensor 6 and the time when the slanted edge 5b or 5'b passes the sensor 6.

The triangle does not need to be a rectangular triangle. A triangle having, for example, three equal sides, or an isosceles triangle are suitable for the present purposes. The base side is considered to be the side that extends perpendicularly to the line 4', and the tip of the triangle that may be truncated, as mentioned, extends in a direction opposite to the travel direction 4. A marker with a V-shape is also suitable with the tip of the V pointing in the direction opposite to the travel direction.

The arrangement of a rectangular triangle 5 as a marker has the advantage that it provides marking signals which indicate a lateral belt deviation direction. For example, if the belt 1 deviates to the right in FIG. 1, the respective marking signal would increase, compared to the signal that is obtained when the belt is in a centered position, while the second marker signal would decrease when the belt deviates to the left in FIG. 1, again as compared to the signal obtained when the belt lateral is centered. These belt deviations from a centered position extend in parallel to the rotational axes of the rollers 2 and 3.

A conventional signal sensor 6 is mounted in a fixed position as shown in FIGS. 1 and 1a. The sensor may, for example, be an inductive operating proximity switch that provides an output signal as soon as the marking element 5 passes with its edge 5a below the marker 6. The signal begins when the edge that extends perpendicularly to the travel direction, for example the edge 5a, of the marking element 5 reaches the sensor 6. The slanted signal ends when the second marking edge, for example 5b, passes below the sensor 6. The signal may actually comprise two individual impulses, one of which is formed when the marker reaches the sensor, and the other of which is formed when the marker passes out of the sensor range. The signal processing is described in more detail below with reference to FIG. 3.

FIGS. 2a, 2b, 2c, and 2d illustrate different relative positions between a trapezoidal marker element 5' and a stationary sensor 6. In each of these figures, the travel direction of the belt 1 is again indicated by the arrow 4.

Figure 2A:
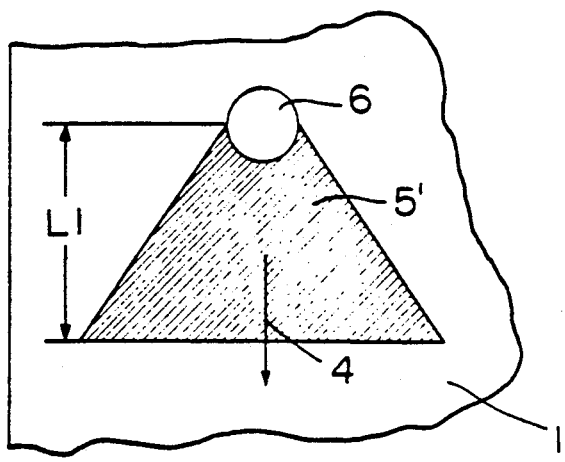
FIGS. 2a-2d show different marker positions relative to a sensor held in a fixed location.

FIG. 2a illustrates a properly aligned and centered belt run in which the shorter rear edge of the trapezoidal marker element 5' coincides with the sensor 6. The signal pulse has a time duration L1 between its leading edge and its trailing edge. Alternately, the signal length may be determined by two signal spikes, one at the beginning and one at the end of the passage of the marker 5' past the sensor 6.

Figure 2B:
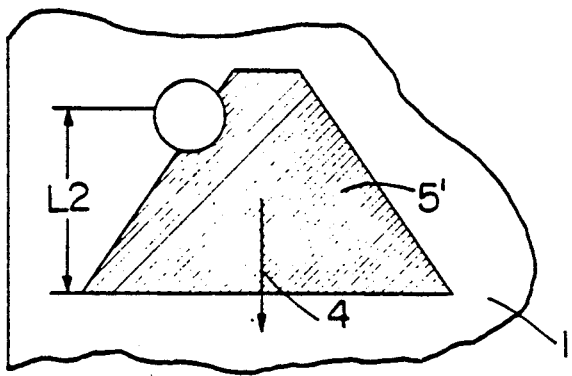

In FIG. 2b the belt 1 deviates somewhat from its centered position and this is indicated by a shorter signal time duration L2. However, in FIG. 2b there is no determination whether the deviation of the belt 1 from its centered position is to the right or to the left as viewed in FIG. 1. To achieve such an indication a rectangular triangle has to be used as a marker as mentioned above. The slight deviation illustrated in FIG. 2b may be used, for example, to provide a warning signal that a further deviation may require correction.

Figure 2C:
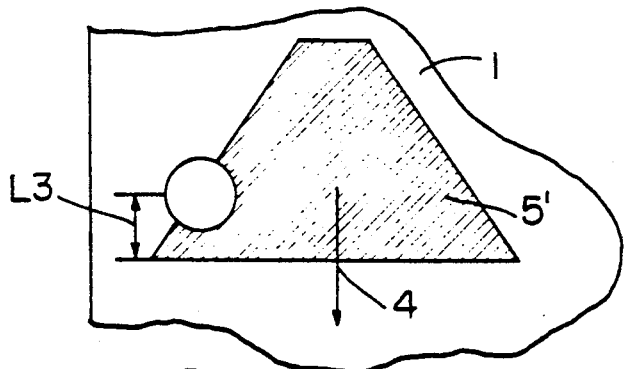

FIG. 2c illustrates a lateral deviation signifying an unpermissible deviation of the belt 1 from its centered position as indicated by a rather short duration signal L3. The signal L3 is substantially shorter in its duration than in FIGS. 2a and 2b. Thus, it is possible to discern this reduced signal length for the purpose of providing an alarm or for stopping the belt drive, or for taking corrective measures to bring the belt back into its centered running position.

Figure 2D:
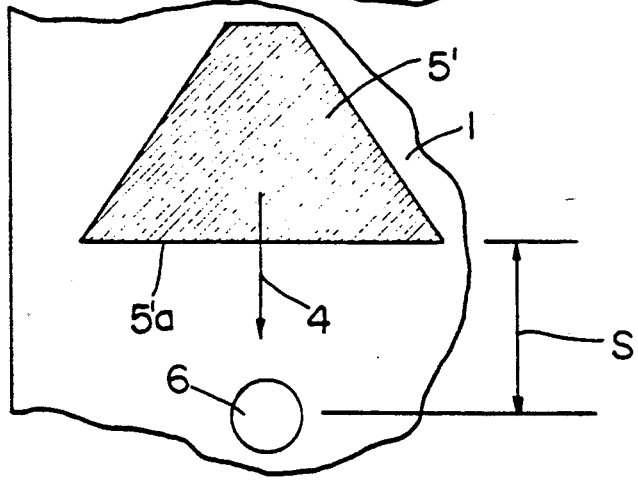

FIG. 2d illustrates a belt position in which a belt slippage S has occurred as indicated by the slippage signal S. Normally, the band speed is measured at the driving roller 2, or at the guide roller 3 as shown in FIG. 1. FIG. 2d' signifies that the leading edge 5'a of the marker element 5' has not yet reached the sensor 6 at a time when the leading edge should have reached the sensor 6 in accordance with a rated or given belt speed as measured at the driving roller 3. This point of time is measured and the time difference t between the theoretical point of interaction between the marker and the sensor, and the actual point of interaction provides the slippage signal S representing a measure S for the belt slippage. The slippage signal S thus represents the time t while the measure s represents a distance which the belt would have travelled during the time t but did not due to slippage between the belt and the drive roller.

Figure 3:
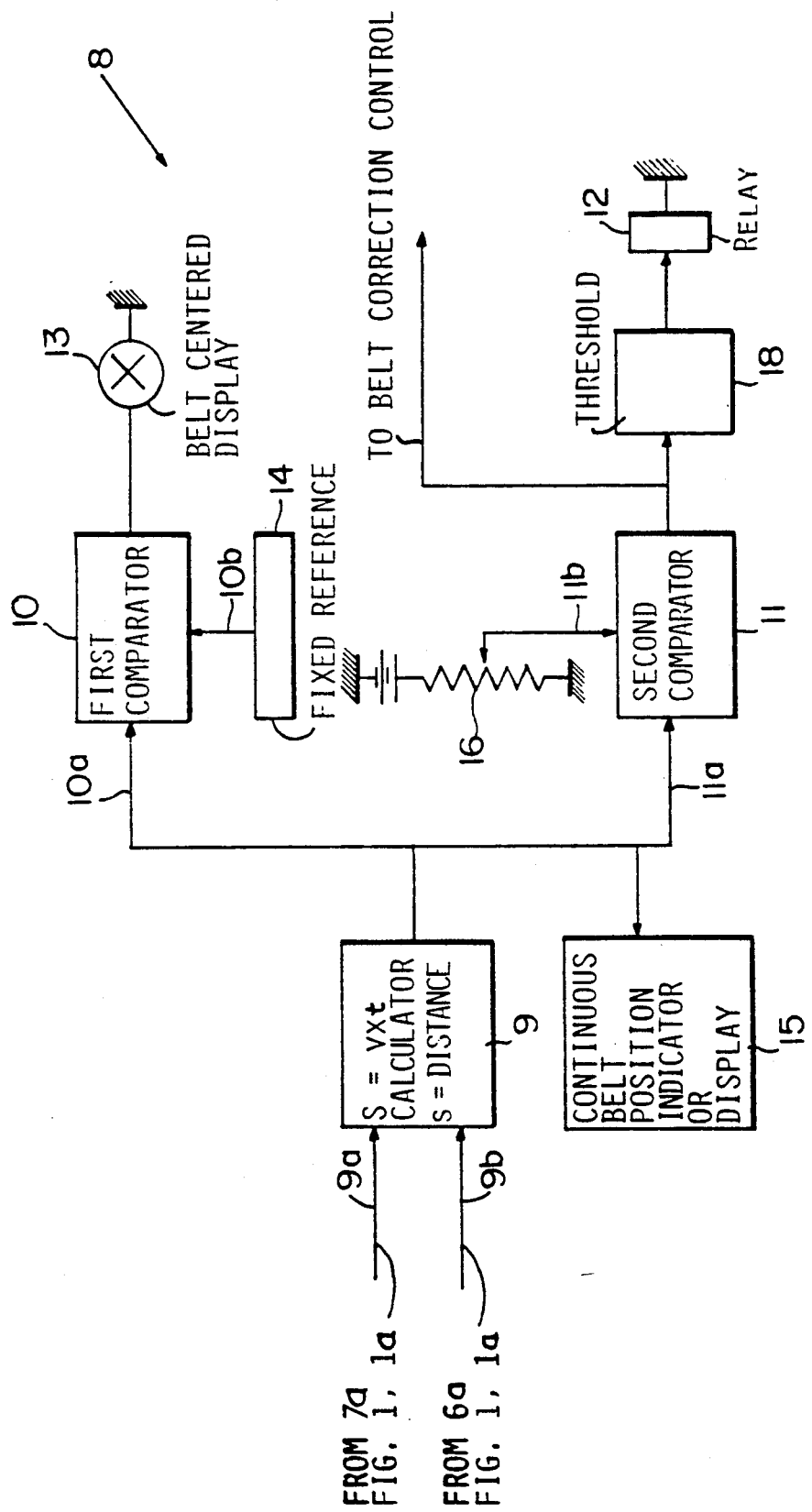
FIG. 3 shows a block circuit diagram for the evaluation of signals obtained from the stationary marker sensor and from a belt speed sensor.

The belt deviation signals referring to a lateral belt displacement and the slippage signal S referring to a longitudinal belt displacement obtained as described above, are evaluated in a suitable computer circuit as shown in FIG. 3. The computer circuit provides the respective signals that can either be displayed for a manual correction, possibly following a preliminary warning signal or in response to an alarm signal as described above when a certain lateral deviation away from the centered position is indicated by the respective signal. The control signal may be used to stop the belt or to initiate a return of the belt into the centered position.

Referring to FIG. 3, the evaluation circuit 8 has a distance calculator or signal multiplier 9 with one input 9a connected to an output 7a of the belt speed sensor 7 shown in FIG. 1 which senses the r.p.m. or speed of the drive roller 2. Another input 9b is connected to an output 6a of the time duration sensor 6 in FIG. 1 which senses the signals L1, L2, L3 and S(t). The above mentioned slippage measure s representing a distance is produced at the output of the calculator 9 and supplied to one input 10a of a first signal comparator 10. The other input 10b of the comparator 10 receives a fixed reference signal from a fixed reference signal circuit 14. This fixed reference signal corresponds to a time duration that represents a centered position of the belt 1 on the rollers 2, 3. More specifically, the fixed reference signal represents L1 in FIG. 2a.

The belt 1 is properly centered on its rollers 2 and 3 in the lateral direction if the fixed reference signal and the calculated signal S coincide. This centered belt condition is displayed by an indicator, such as a green light or the like shown at 13.

A second comparator 11 also receives at its input 11a the output signal from the calculator 9. A further input 11b of the second comparator 11 receives an adjustable reference signal from a respective reference signal circuit 16. The adjustable reference signal corresponds to any one of the distances L2, L3 in FIGS. 2b and 2c. Thus, the second comparator 11 produces at its output a signal that may be displayed as an indication that the belt deviation is within acceptable limits, e.g. when the off-center deviation is not larger than shown in FIG. 2b.

When the output signal from the second comparator 11 exceeds a certain threshold value as determined by a threshold circuit 18, a control signal is produced by the threshold circuit 18 to energize a relay 12 which opens a normally closed relay contact 12a to switch off the belt drive motor 17 shown in FIG. 1. Such switch-off may, for example, be caused when the difference between the signal signifying a centered belt and the actually calculated signal at the output of the calculator 9 exceeds a set threshold. For example, L3 in FIG. 2c may determine such a threshold.

The variable reference signal circuit 16 may, for example, be a memory having stored therein a plurality of reference signals signifying an approach to an unpermissable belt deviation.

The output of the second comparator circuit provides also a belt position correction signal as long as the threshold signal for stopping the belt is not reached. The belt position correction signal may be supplied to conventional correction means for returning the belt into a centered position. If correction is no longer possible the permissable threshold will be exceeded and the motor 17 will be switched off as described above, by relay 12.

FIG. 3 further shows a continuous indicator device 15 connected to the output of the calculator 9 for providing continuous information regarding the instantaneous belt position. The indication may show the deviation, e.g. as a percentage of a deviation range. When the indication or display at 15 is zero %, the light 13 will be lit. In this instance the belt will be centered. The indicator or display 15 preferably shows the right and left deviations from a centered position.

Although the invention has been described with reference to specific example embodiments it will be appreciated that it is intended to cover all modifications and equivalents within the scope of the appended claims.

What I claim is:

1. A method for monitoring the run of a belt, relative to a centered belt position, comprising the following steps:
   (a) applying a single marking element to said belt, said marking element having at least one first marking edge extending substantially perpendicularly to a running direction to said belt and at least one second marking edge extending at a slant to said running direction,
   (b) positioning a sensor in a stationary location relative to said belt for sensing said marking element when the marking element passes said sensor for sensing the passing of said first and second marking edges to produce respective first and second sensor signals representing a time duration that depends on a lateral belt deviation of said belt from said centered position due to said slant and on a belt slippage in the longitudinal belt direction based on the actual belt speed,
   (c) providing a belt drive speed signal, and
   (d) producing from said first and second sensor signals and from said belt drive speed signal a belt correction signal which indicates at least one of a lateral belt deviation of said belt from a known belt centered position and a belt slippage in the longitudinal belt direction relative to said belt drive speed signal.

2. The method of claim 1, comprising processing said first and second sensor signals and said belt drive speed signal in a computer means for producing said belt correction signal.

3. The method of claim 2, further comprising displaying said belt correction signal.

4. The method of claim 2, further comprising using said belt correction signal for controlling the belt position.

5. The method of claim 1, comprising processing said first and second sensor signals and said belt drive speed signal in a computer for producing a belt slippage signal.

6. The method of claim 5, further comprising displaying said belt slippage signal.

7. The method of claim 5, further comprising using said belt correction signal for controlling the belt speed.

8. An apparatus for monitoring the run of a belt relative to a centered belt position, comprising a single marking element on or in said belt, stationary sensor means for scanning said signal marking element when said marking element passes said sensor means, said single marking element having a first marking edge extending substantially perpendicularly to a running direction of said belt and at least one second marking edge extending at a slant to said running direction, said first and second marking edges producing in said sensor means respective first and second sensor signals representing a lateral belt deviation from said centered position, means for sensing a belt drive speed signal, and means for producing a belt position control signal for correcting a belt position.

9. The apparatus of claim 8, wherein said marking element has a triangular shape arranged on said belt in such an orientation that one triangle side forming said first marking edge extends perpendicularly to said belt running direction while another triangle side forming said second marking edge slants to the running direction.

10. The apparatus of claim 8, wherein said marking element has a trapezoidal shape having four sides arranged on said belt so that one side of said four sides of the trapezoid extends perpendicularly to said belt running direction while a slanting side of said trapezoid extends at an angle to said belt running direction.

11. The apparatus of claim 8, wherein said marking element has the configuration of a triangle having a base side and at least two sides of equal length, said base side forming said first marking edge extending perpendicularly to said belt running direction, and wherein said sensor means is positioned to sense a triangle tip providing said second marking edge formed by said at least two sides of equal length when said belt is substantially in said centered belt position.

12. The apparatus of claim 8, wherein said marking element has the configuration of a rectangular triangle having two sides and a hypotenuse whereby one side of said rectangular triangle extends in said belt running direction, and another triangle side extends perpendicularly to said running direction to form said first marking edge, and wherein said sensor means is positioned to sense a center of said hypotenuse of said triangle forming said second marking edge when said belt is substantially in said centered belt position.

13. The apparatus of claim 8, wherein said marking element is a metallic switching foil, and means securing said metallic switching foil to said belt.

14. The apparatus of claim 8, wherein said marking element is a metallic switching foil, and means holding said metallic switching foil inside said belt.

15. The apparatus of claim 8, wherein said sensor means comprises a contactless proximity switch.

16. The apparatus of claim 8, wherein said first and second signals are the leading and trailing edge of a single signal.

* * * * *